United States Patent Office 2,719,832
Patented Oct. 4, 1955

2,719,832

PRODUCTION OF MOISTUREPROOF COATINGS, IMPREGNATIONS, PRINTS, AND THE LIKE ON FIBROUS MATERIALS AND MIXTURES THEREFOR

Karl Craemer, Heidelberg, and Friedrich Hoelscher, Otterstadt, Pfalz, Germany, assignors to Badische Anilin- & Soda-Fabrik Aktiengesellschaft, Ludwigshafen (Rhine), Germany No Drawing. Application October 7, 1952,
Serial No. 313,598

Claims priority, application Germany October 20, 1951

31 Claims. (Cl. 260—29.4)

This invention relates to a process for the production of moisture-proof coatings, impregnations and prints on fibrous materials and to mixtures of substances suitable for carrying out the said process.

It is known to use aqueous dispersions of polymers in the presence of hardenable resins as finishing agents and as binding agents for pigment prints and dyeings on fibrous materials. According to a prior proposal, the fastness to moisture and rubbing of such coatings can be improved by employing solutions or dispersions of polymers having reactive hydrogen atoms in admixture with incompletely condensed condensation products and then cross-linking the reactive groups of the binding agent with polyfunctional compounds, if desired in the presence of potentially acid hardening agents.

We have now found that finishes, pigment prints, pigment dyeings and the like which are especially fast to rubbing, supple and of excellent fastness to washing are obtained by treating fibrous materials with mixtures, which may contain pigments, which contain as film-forming agents or binding agents aqueous dispersions of polymers having reactive halogen atoms and acid amide groups, advantageously carboxylic acid amide groups, and hardenable precondensates of thermosetting resins and preferably hardening agents, such as inorganic or organic acids or ammonium salts of strong acids.

These mixtures are applied to natural or artificial fibrous materials, e. g. fibers of natural or regenerated cellulose, cellulose acetate, polyamide, polyacrylonitrile, linear polyesters, wool or silk, and the fibrous materials, after drying for example at about 50° to 100° C., are heated for a short time at elevated temperature, preferably at 100° to 160° C.

Eminently suitable polymers are copolymers which contain reactive halogen atoms and carboxylic acid amide groups at the same time, for example copolymers from as-dichlorethylene or vinyl chloride and acrylic acid amide or from acrylic or methacrylic acid beta-chlorethyl ester, alpha-chloracrylic acid esters or vinyl-beta-chlorethyl ether and methacrylic acid amide. Such copolymers may also contain other monomers without reactive groups, such as acrylic acid esters, styrene, butadiene and the like, in order to modify the film properties. The content of reactive groups of these copolymers may be modified within wide limits. There may also be used, however, mixtures of polymers or copolymers in which one of the polymers or copolymers contains only reactive halogen atoms and the other contains only acid amide groups, for example mixtures of a copolymer of as-dichlorethylene and acrylonitrile with a copolymer of acrylic acid amide and acrylic acid ethyl ester.

Among hardenable precondensates there may be mentioned all water-soluble precondensates which are capable of being hardened by acids or potentially acid substances and/or by heat, preferably initial condensation products of aminoplast forming resins, as for example the reaction product of formaldehyde or substances splitting off formaldehyde with urea, thiourea, alkylated ureas, acetylene diurea, amino-triazines, such as melamine dicyanodiamide, guanidine, urethanes, diurethanes, glyoxal monourein, further phenol-aldehyde resins and the like. The ethers of methylol compounds yielding thermosetting resins are also useful. The ratio of polymer to condensate may be modified within wide limits, but it is usual to work with an excess of polymer.

The mixtures may be employed in the aqueous phase alone (as aqueous dispersions) or with the addition of oil-in-water emulsions, preferably emulsions of organic readily volatile solvents the boiling point of which is between 75° and 220° C., as for example benzine, xylene, toluene or trichlorethylene; there may be added thereto softeners, protective colloids, fillers and other assistants, such as hydrophobing agents, flameproofing agents and the like according to the properties required in the coatings, impregnations or pigment prints.

The following examples will further illustrate this invention but the invention is not restricted to these examples. The parts are by weight.

*Example 1*

50 parts of an about 40% aqueous dispersion of a copolymer from 50 parts of acrylic acid-beta-chlorethyl ester, 40 parts of methyl acrylate and 10 parts of acrylamide are diluted with 200 parts of water. 4 parts of 25% ammonia, 20 parts of a 50% aqueous solution of tetramethylolacetylene diurea, 50 parts of a 4% aqueous solution of ammonium polyacrylate, 8 parts of a 25% aqueous pigment paste of the azo dyestuff from 2 mols of diazotized 2.4-dichloraniline coupled with diacetoacetyl-3.3'-tolidine and 2 parts of a 50% aqueous solution of ammonium nitrate are then stirred in and the whole made up with water to 1000 parts.

This dyebath is filtered through a fine hair sieve and a cotton fabric is slop-padded therewith. After drying at 60° to 80° C., it is heated for 5 to 8 minutes at about 130° C. A uniformly dyed fabric is obtained, the dyeing being fast to rubbing and washing.

Trimethylolmelamine or dimethylolurea may also be employed instead of tetramethylolacetylene diurea.

*Example 2*

An emulsion is prepared of which the outer phase contains 50 parts of a 40% aqueous dispersion of a copolymer of 50 parts of as-dichlorethylene, 45 parts of butyl acrylate and 5 parts of acrylamide, together with 2 parts of 25% ammonia, 10 parts of a 6% tragacanth thickening, 20 parts of a 50% aqueous solution of dimethylol-1.4-butanediol diurethane, 1 part of ammonium nitrate and 17 parts of water, while the inner phase consists of 40 to 50 parts of test benzine. 5.7 parts of an about 35% pigment paste of copper phthalocyanine are dispersed in 94.3 parts of the said emulsion. The resulting printing paste in printed onto a web, for example of cellulose staple fiber or polyamide, by machine printing. After drying, the web is heated to 130° to 140° C. for 6 to 10 minutes. A soft print is obtained which is extremely fast to rubbing and washing.

*Example 3*

150 parts of aluminum powder are wetted with 60 parts of a 10 percent aqueous solution of the reaction product of 1 mol of oleylalcohol and 30 mols of ethylene oxide and dispersed in 760 parts of an emulsion, the outer phase of which consists of 42 parts of a 40 percent aqueous dispersion of an interpolymer from 52 parts of vinyl chloride, 35 parts of butyl acrylate, 7 parts of methyl acrylate and 6 parts of acrylic acid amide as well as 1 part of 25 percent ammonia, 6 parts of a 6 percent tragacanth thickening, 1 part of glycerin, 15 parts of a 60 percent aqueous solution of melamine resin, 1 part of ammonium thiocyanate and 20 parts of water, whereas the inner phase consists of 64 parts of crystal oil. This printing paste is applied by screen printing to a suede leather which has already been dyed. After drying at room temperature and after-heating at 90° to 100° C. a supple and adherent metal print on leather is obtained.

*Example 4*

A printing emulsion is prepared as in Example 1 from the following:

40 parts of an aqueous dispersion (50%) of a copolymer from 40% vinyl chloride, 50% butyl acrylate and 10% methacrylic acid amide,
10 parts of a 5% aqueous solution of methyl cellulose,
20 parts of a 40% aqueous solution of an initial condensation product from glyoxal monourein and formaldehyde,
1 part of ammonium sulfate,
40 parts of trichloroethylene,
5 parts of a 35% pigment paste of copper phthalocyanine,
4 parts of 25% ammonia.

A textile, such as cotton, printed with this emulsion is excellently fast to rubbing and washing.

*Example 5*

A printing paste is prepared from the following:

50 parts of an aqueous dispersion (50%) of a copolymer from 20% methacrylic acid-beta-chloroethyl ester, 50% propyl acrylate and 30% acrylic acid amide,
5 parts of a sodium alginate paste (3%),
20 parts of a 35% aqueous solution of an initial condensation product from melamine and formaldehyde,
1.2 parts of ammonium nitrate,
5 parts of a 30% pigment paste of finely-powdered iron oxide.

This printing paste may be used for printing fabrics, for example a polyacrylonitrile fabric.

*Example 6*

A printing emulsion is prepared as in Example 1 from the following:

25 parts of an aqueous dispersion (40%) of a copolymer from 20% vinyl-beta-chlorethyl ether and 80% methyl acrylate,
30 parts of an aqueous dispersion (50%) of a copolymer from 40% butyl acrylate, 50% acrylonitrile and 10% acrylamide,
10 parts of a 5% aqueous solution of sodium pectinate,
25 parts of a 30% aqueous solution of dimethyloldimethyl urea,
1.5 parts of ammonium nitrate,
50 parts of gasoline,
5 parts of a pigment paste prepared as in Example 1,
3 parts of 25% ammonia.

*Example 7*

A printing emulsion is prepared as in Example 1 from the following:

25 parts of an aqueous dispersion (40%) of a copolymer from 40% of as-dichloroethylene, 35% acrylonitrile and 25% propyl acrylate,
25 parts of an aqueous dispersion (40%) of a copolymer from butyl acrylate (45%), 35% vinyl chloride and 20% methacrylic acid amide,
10 parts of a 5% aqueous solution of sodium polyacrylate,
10 parts of the bis-methyl ether of tetramethylolmelamine,
1 part of tartaric acid,
50 parts of xylene,
5 parts of a 35% pigment paste of copper phthalocyanine, and
5 parts of 25% ammonia.

A rayon fabric printed with this emulsion is very soft and extremely fast to rubbing and washing.

What we claim is:

1. A printing composition for printing a pigment on a fibrous material which comprises an oil-in-water emulsion containing in the discontinuous phase a volatile water immiscible organic solvent and having an aqueous continuous phase, said emulsion comprising a pigment (A) and said aqueous phase comprising a mixture containing in aqueous dispersion a polymer (B) of a monomer containing a $CH_2=C<$ group from the group consisting of (1) a copolymer of an amide of an acrylic acid with a monomer from the group consisting of halogenated ethylenes, halogenated vinyl ethers and halogenated esters of acrylic acids, and (2) a mixture of at least two polymers of monomers containing a $CH_2=C<$ group one of which contains an amide group of an acrylic acid and the other a polymer of a monomer from the group consisting of halogenated ethylenes, halogenated vinyl ethers and halogenated esters of acrylic acids, and a hardenable precondensate of a thermosetting resin (C) from the group consisting of a methylolamine and an ether of a methylolamine capable of forming a thermosetting resin, said methylolamine being from the group consisting of water soluble condensation products of formaldehyde and a member from the group consisting of urea, thiourea, an alkylated urea, acetylene diurea, an amino-triazine, guanidine, a urethane, a diurethane and glyoxal monourein.

2. A process for affixing a dye to a fibrous material which comprises applying to said fibrous material a composition containing in aqueous dispersion a pigment (A), a polymer (B) of a monomer containing a $CH_2=C<$ group from the group consisting of (1) a copolymer of an amide of an acrylic acid with a monomer from the group consisting of halogenated ethylenes, halogenated vinyl ethers and halogenated esters of acrylic acids, and (2) a mixture of at least two polymers of monomers containing a $CH_2=C<$ group one of which contains an amide group of an acrylic acid and the other a polymer of a monomer from the group consisting of halogenated ethylenes, halogenated vinyl ethers and halogenated esters of acrylic acids, and a hardenable precondensate of a thermosetting resin (C) from the group consisting of a methylolamine and an ether of a methylolamine capable of forming a thermosetting resin, said methylolamine being from the group consisting of water soluble condensation products of formaldehyde and a member from the group consisting of urea, thiourea, an alkylated urea, acetylene diurea, an amino-triazine, guanidine, a urethane, a diurethane and glyoxal monourein, and heating the resultant material containing said composition to a temperature of at least 100° C.

3. A process of printing textile fabrics which comprises printing on a textile fabric with an oil-in-water emulsion containing in the discontinuous phase a volatile water immiscible organic solvent and having an aqueous continuous phase, said emulsion comprising a pigment (A) and said aqueous phase comprising a mixture containing in aqueous dispersion a polymer (B) of a monomer containing a $CH_2=C<$ group from the group consisting of (1) a copolymer of an amide of an acrylic acid with a monomer from the group consisting of halogenated ethylenes, halogenated vinyl ethers and halogenated esters of acrylic acids, and (2) a mixture of at least two polymers of monomers containing a $CH_2=C<$ group one of which contains an amide group of an acrylic acid and the other a polymer of a monomer from the group consisting of halogenated ethylenes, halogenated vinyl ethers and halogenated esters of acrylic acids, and a hardenable precondensate of a thermosetting resin (C) from the group consisting of a methylolamine and an ether of a methylolamine capable of forming a thermosetting resin, said methylolamine being from the group consisting of water soluble condensation products of formaldehyde and a member from the group consisting of urea, thiourea, an alkylated urea, acetylene diurea, an amino-triazine, guanidine, a urethane, a diurethane and glyoxal monourein, and heating the printed fabric to a temperature of at least 100° C.

4. A composition as claimed in claim 1 in which the proportion of polymer (B) is greater than the proportion of the hardenable precondensate of a thermosetting resin (C).

5. A composition as claimed in claim 1 which also includes a hardening agent for the hardenable precondensate of a thermosetting resin (C).

6. A composition as claimed in claim 1 in which said polymer (B) is a copolymer of vinyl chloride and an acrylic acid amide.

7. A composition as claimed in claim 1 in which said polymer (B) is a copolymer of as-dichloroethylene and an acrylic acid amide.

8. A composition as claimed in claim 1 in which said polymer (B) is a copolymer of a chlorinated vinyl ether and an acrylic acid amide.

9. A composition as claimed in claim 1 in which said polymer (B) is a chlorinated ester of an acrylic acid and an acrylic acid amide.

10. A printing composition for printing a pigment on a fibrous material which comprises an oil-in-water emulsion containing in the discontinuous phase a volatile water immiscible organic solvent and having an aqueous continuous phase, said emulsion comprising a pigment (A) and said aqueous phase comprising a mixture containing in aqueous dispersion a copolymer (B) of a chlorinated ethylene, an acrylic acid amide and a lower alkyl ester of an acrylic acid, and a hardenable precondensate of a thermosetting resin (C) from the group consisting of a methylolamine and an ether of a methylolamine capable of forming a thermosetting resin, said methylolamine being from the group consisting of water soluble condensation products of formaldehyde and a member from the group consisting of urea, thiourea, an alkylated urea, acetylene diurea, an amino-triazine, guanidine, a urethane, a diurethane and glyoxal monourein.

11. A composition as claimed in claim 10 in which said copolymer (B) is a copolymer of vinyl chloride, an acrylic acid amide and a lower alkyl ester of an acrylic acid.

12. A composition as claimed in claim 10 in which said copolymer (B) is a copolymer of as-dichloroethylene, an acrylic acid amide and a lower alkyl ester of an acrylic acid.

13. A composition as claimed in claim 10 in which the hardenable precondensate of a thermosetting resin (C) is a methylol urea.

14. A composition as claimed in claim 10 in which the hardenable precondensate of a thermosetting resin (C) is an ether of a methylol urea.

15. A composition as claimed in claim 10 in which the hardenable precondensate of a thermosetting resin (C) is a methylolmelamine.

16. A composition as claimed in claim 10 in which the hardenable precondensate of a thermosetting resin (C) is an ether of a methylolmelamine.

17. A composition as claimed in claim 10 in which the hardenable precondensate of a thermosetting resin (C) is a methylol acetylene diurea.

18. A process as claimed in claim 2 in which the proportion of polymer (B) is greater than the proportion of the hardenable precondensate of a thermosetting resin (C) in said composition.

19. A process as claimed in claim 2 in which said composition also includes a hardening agent for the hardenable precondensate of a thermosetting resin (C).

20. A process as claimed in claim 2 in which said polymer (B) is a copolymer of vinyl chloride and an acrylic acid amide.

21. A process as claimed in claim 2 in which said polymer (B) is a copolymer of as-dichloroethylene and an acrylic acid amide.

22. A process as claimed in claim 2 in which said polymer (B) is a copolymer of a chlorinated vinyl ether and an acrylic acid amide.

23. A process as claimed in claim 2 in which said polymer (B) is a chlorinated ester of an acrylic acid and an acrylic acid amide.

24. A process for affixing a dye to a fibrous material which comprises applying to said fibrous material a composition containing in aqueous dispersion a pigment (A), a copolymer (B) of a chlorinated ethylene, an acrylic acid amide and a lower alkyl ester of an acrylic acid, and a hardenable precondensate of a thermosetting resin (C) from the group consisting of a methylolamine and an ether of a methylolamine capable of forming a thermosetting resin, said methylolamine being from the group consisting of water soluble condensation products of formaldehyde and a member from the group consisting of urea, thiourea, an alkylated urea, acetylene diurea, an amino-triazine, guanidine, a urethane, a diurethane and glyoxal monourein, and heating the resultant material containing said composition to a temperature of at least 100° C.

25. A process as claimed in claim 24 in which said copolymer (B) is a copolymer of vinyl chloride, an acrylic acid amide and a lower alkyl ester of an acrylic acid.

26. A process as claimed in claim 24 in which said copolymer (B) is a copolymer of as-dichloroethylene, an acrylic acid amide and a lower alkyl ester of an acrylic acid.

27. A process as claimed in claim 24 in which the hardenable precondensate of a thermosetting resin (C) is a methylol urea.

28. A process as claimed in claim 24 in which the hardenable precondensate of a thermosetting resin (C) is an ether of a methylol urea.

29. A process as claimed in claim 24 in which the hardenable precondensate of a thermosetting resin (C) is a methylolmelamine.

30. A process as claimed in claim 24 in which the hardenable precondensate of a thermosetting resin (C) is an ether of a methylolmelamine.

31. A process as claimed in claim 24 in which the hardenable precondensate of a thermosetting resin (C) is a methylol acetylene diurea.

References Cited in the file of this patent

UNITED STATES PATENTS 2,600,681    Park et al. _____ June 17, 1952